(12) United States Patent
Mueller

(10) Patent No.: US 6,485,272 B2
(45) Date of Patent: Nov. 26, 2002

(54) FLUID PROPORTIONER

(76) Inventor: Thomas D. Mueller, 660 E. Woodland Dr., Lake Forest, IL (US) 60045

( * ) Notice: Subject to any disclaimer, the term of this patent is extended or adjusted under 35 U.S.C. 154(b) by 0 days.

(21) Appl. No.: 09/767,409

(22) Filed: Jan. 23, 2001

(65) Prior Publication Data

US 2002/0098096 A1 Jul. 25, 2002

(51) Int. Cl.[7] .......................... F04B 17/00; F04B 35/00
(52) U.S. Cl. ...................................... 417/403; 417/398
(58) Field of Search ................................ 417/403, 404, 417/397, 398, 399, 400; 137/98, 99; 251/228; 91/339

(56) References Cited

U.S. PATENT DOCUMENTS

| | | | |
|---|---|---|---|
| 3,114,379 A | 12/1963 | Cordis | 137/98 |
| 3,131,707 A | 5/1964 | Cordis | 137/99 |
| 3,213,796 A | 10/1965 | Cordis | 103/38 |
| 3,213,873 A | 10/1965 | Cordis | 137/99 |
| 3,291,086 A | 12/1966 | Cordis | 103/153 |
| 3,971,341 A * | 7/1976 | Bron | 119/72 |
| 4,004,602 A * | 1/1977 | Cordis et al. | 137/99 |
| 4,161,308 A * | 7/1979 | Bell et al. | 251/228 |
| 4,572,229 A * | 2/1986 | Mueller et al. | 137/99 |
| 5,035,261 A * | 7/1991 | Koiwa | 137/516.11 |
| 5,173,036 A * | 12/1992 | Fladby | 417/403 |
| 5,433,240 A * | 7/1995 | Mueller | 137/99 |
| 5,628,496 A * | 5/1997 | Chamberlin | 267/64.11 |
| 5,794,943 A * | 8/1998 | Atmur et al. | 277/441 |

* cited by examiner

Primary Examiner—Charles G. Freay
Assistant Examiner—Han L Liu
(74) Attorney, Agent, or Firm—Sonnenschein Nath & Rosenthal

(57) ABSTRACT

An improved fluid proportioner. For improved fluid flow, a body is configured to direct a first fluid wherein at least one fluid gate housing is removably fixed to the body. A bearing pressurably is fitted within the at least one fluid gate housing to seal the first fluid within the body. A fluid gate is disposed within the body configured to gate the first fluid to alternating sides of a motor cylinder having a motor piston sealably disposed within. The motor piston has a cap attached at an end wherein the cap has a concave annular groove. A seal is surroundably disposed around the concave annular groove which radially extends beyond the cap to pressurably engage against the motor cylinder to reduce friction. A slave pump has a inlet valve and a outlet valve with an inlet raised base formed around an inlet orifice and an outlet raised base formed around an outlet orifice.

23 Claims, 5 Drawing Sheets

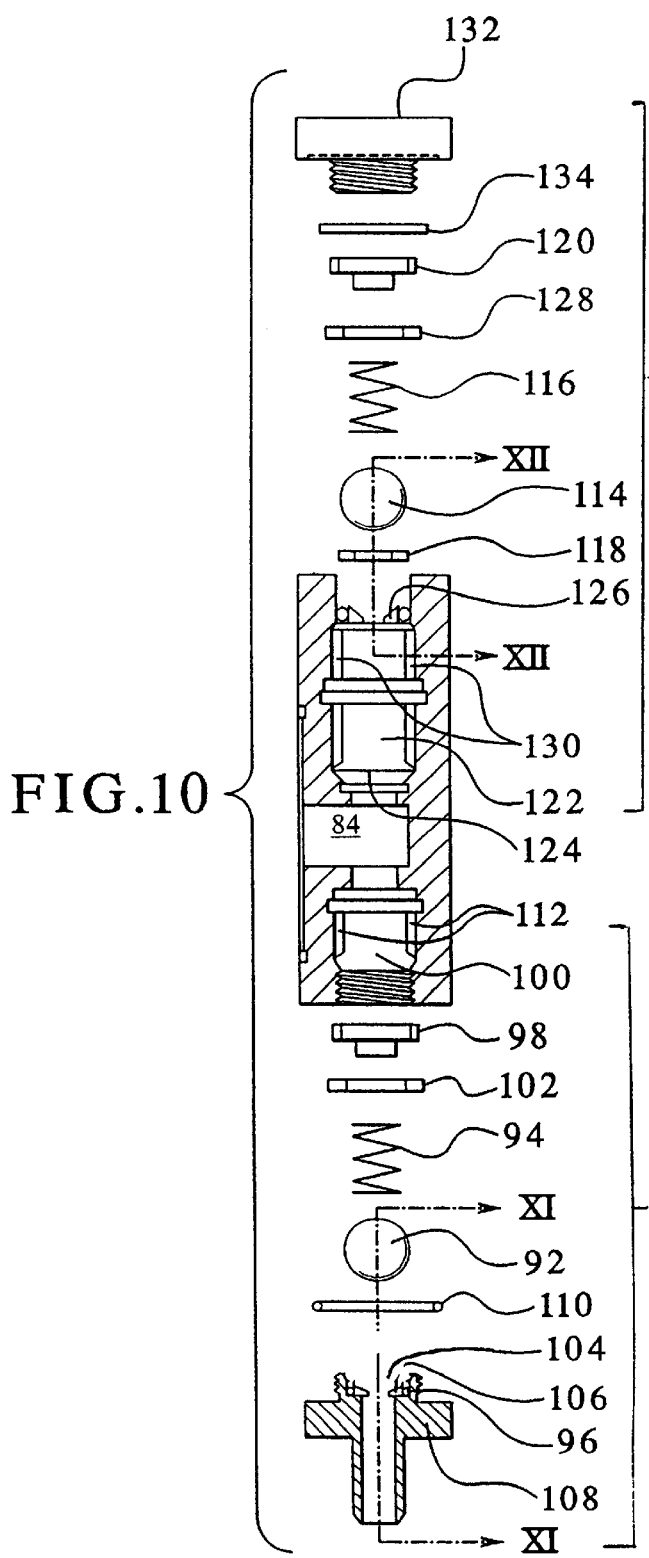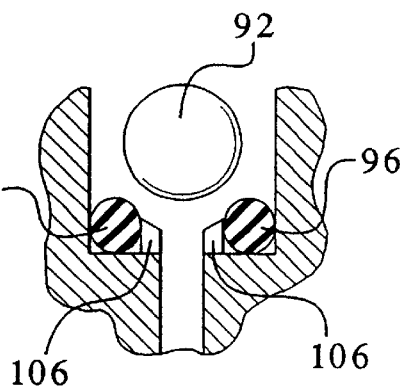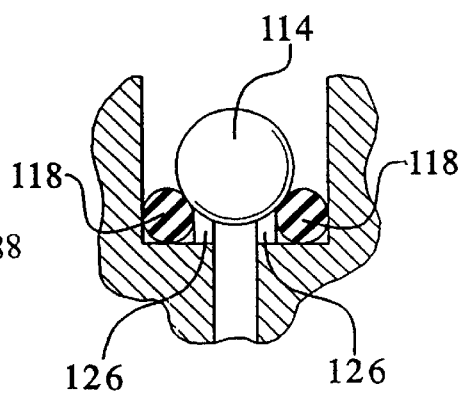

FLUID PROPORTIONER

BACKGROUND OF THE INVENTION

The present invention generally relates to mixing fluids. More specifically, the invention relates to the continuous mixing of two fluids in a variable proportion into an exit stream.

The proportional mixing of fluids by automatic, self-powered devices is known. Such a device can be used to mix a fluid stream, such as water, with another fluid such as drugs, vaccines, nutrients, treating agents, powders, biologicals or the like. Traditional self-powered proportioners have a fluid motor and slave pump.

In a traditional self-powered proportioner, the pressure of a first fluid stream, such as water, is used to power the device. The first fluid stream cyclically moves a motor piston within a cylinder, automatically metering an amount of the first fluid with each stroke by filling the cylinder with fluid. A gating device alternates the fluid intake from one side of the motor piston to the other. Intake fluid pressure causes the motor piston to move, while fluid on the opposite side of the motor piston is simultaneously expelled. In one cycle of the proportioner, two displacements of the first fluid are expelled from the cylinder into the exit stream.

Traditional proportioners utilize a shielded grease filled bearing around the gating device in areas where the gating device enters the fluid motor. The grease and the non contacting shield are applied as a seal to prevent the first fluid from entering the bearing. Further, the grease is applied as a seal to prevent the first fluid contacting the rotating bearings not positioned within the fluid motor in an improved movement of the gating device and improved work life. Incorporating grease as a seal contains deficiencies however. The grease easily breaks down over time resulting in the first fluid escaping into the bearing. Accordingly, this grease breakdown leads to inefficient operation of the proportioner Further, the grease breakdown leads to the leaking of the bearing assembly resulting in contamination of the driving fluid. Further, in traditional proportioners, the fluid motor is not protected from impact during installation of the gating device bearings. As such, when the gating device is installed inside the fluid motor, the gating device directly impacts the bearings and distorts the internal races.

In known proportioners, the motor piston powers a slave pump. The slave pump has a slave piston and slave cylinder. The slave piston has one working side, compared to the motor piston which has two. The slave pump draws in an amount of a second fluid through an intake, then expels the second fluid through an outlet into the exit stream. The expelled second fluid mixes with the first fluid expelled from the motor piston. Proportioners commonly used in the industry use a checkball at the inlet and outlet of the slave pump. An O-ring is positioned around the inlet/outlet to seal the inlet/outlet when acted upon by the checkball. The O-ring is positioned such that the O-ring contacts the checkball in the same plane. This positioning however leads to a shorter work life of the O-ring as the checkball completely deforms the O-ring during each cycle. Because of the complete deformation, the O-ring deteriorates further resulting in a less efficient seal. Additionally, this positioning and deformation results in the checkball frequently adhering to the O-ring as the checkball contacts the O-ring head on resulting in reduced flow.

In known proportioners, the slave piston is driven by a connecting rod that is connected to the motor piston. In the proportioner disclosed in U.S. Pat. No. 4,572,229, a cavity in the housing surrounding the connecting rod acts as a fluid conduit between the motor cylinder and the back of the slave piston. Thus, the back of the slave piston is exposed to the same fluid pressure as one side of the motor piston. Thus, to achieve the desired movement, the area of the motor piston is larger than the area of the slave piston.

To achieve lower mixing ratios, traditional proportioners utilize the slave piston which has a larger area than in the proportioner described above. A larger slave piston area, though, results in a larger inefficiency, because a larger slave piston has a larger back-pressure force acting on it. If the slave piston is too large in relation to the motor piston, the power of the fluid motor cannot overcome the slave piston back-pressure and internal friction, stalling the proportioner.

Further, traditional proportioners use a motor piston which directly engages the cylinder causing increased friction resulting in lower performance and a reduction in capacity. Traditional proportioners utilize an O-ring, typically buna, as a seal on the piston. This O-ring configuration contains deficiencies, however. As the piston stops at each stroke to change direction, the O-ring adheres to the cylinder wall. Thus, force by the driving fluid must first overcome the adhesion before driving the piston in the opposite direction. Accordingly, at the end of the next stroke prior to changing direction, the O-ring again adheres to the cylinder wall. Consequently, an inefficient rocking motion develops within the piston resulting in an elliptical as opposed to circular action on the O-ring which distorts the O-ring. This rocking motion is most acute at the far end of the stroke. Because of the distortion, the O-ring wears more quickly requiring frequent replacement. A lubricant cannot be used inside the fluid motor because it would mix with the first fluid. Accordingly, the motor piston reciprocates with less efficiency.

Thus, proportioners provide constant and variable proportions of the first and second fluids mixed in each cycle. Common proportioners are described in U.S. Pat. Nos. 4,572,229, 5,433,240, issued to Thomas D. Mueller, and U.S. Pat. Nos. 3,114,379, 3,131,707, 3,213,796, 3,213,873 and 3,291,066 issued to Nat Cordis, which are incorporated herein by reference. The present invention is an improvement thereof.

A need exists for a proportioner with maximized efficiency. A need also exists for a self-powered proportioner that can mix fluids in variable ratios. A need also exists in a proportioner with an improved seal to prevent the first fluid from escaping the proportioner. Further, a need exists to protect the proportioner during installation of the gate device. Additionally, a need exists in the art for a more efficient motor piston. A need also exists for a more efficient flow of the second fluid.

SUMMARY OF THE INVENTION

The present invention provides a proportioner which overcomes the above described deficiencies of known proportioners. More specifically, the present invention relates to an improved proportioner. To this end, in an embodiment, a portable self-powered fluid proportioning device is provided. A fluid supply conduit supplies a first fluid to a body. A fluid gate is disposed within the body intermediate the fluid supply and a motor piston to cause reciprocating movement of the motor piston within a motor cylinder.

A connecting rod is secured to the motor piston for movement therewith. A slave pump has a slave piston secured to the connecting rod for providing responsive reciprocatory movement of the slave piston within slave cylinder for pumping a second fluid.

A proportioning device is provided with a body which is configured to direct a first fluid within an interior of the body wherein at least one fluid gate housing is removably fixed to the body. In the preferred embodiment, the at least one fluid gate housing comprises a first fluid gate housing and a second fluid gate housing located opposite each other on the body. Further, in the preferred embodiment, an isolated bearing is pressurably fitted within the at least one fluid gate housing. Additionally, the proportioning device includes a seal positioned between the interior of the body and the bearing. The at least one fluid gate housing has a first end and a second end, the first end is configured in a first circle shape defining a first aperture therethrough, the second end is configured in a second circle shape defining a second aperture therethrough, where the second aperture is configured smaller than the first aperture.

Further, in the preferred embodiment, the bearing fits inside the at least one fluid gate housing upon a seat. The bearing has an external race and an internal race, the external race is pressurably positioned within the first aperture while the internal race is configured to rotate with the fluid gate to reduce friction of the fluid gate.

In a preferred embodiment, the proportioning device is provided wherein the motor piston is sealably disposed within the motor cylinder in which the motor piston has a cap attached at an end. The cap has a concave annular groove with a seal surroundably disposed around the concave annular groove. The seal radially extends beyond the cap to pressurably engage against the motor cylinder in which the cap reduces friction between the motor piston and motor cylinder.

In an embodiment, a proportioning device is provided with an inlet valve. The inlet valve comprises an inlet checkball and an inlet spring within an inlet duct having at least one elongated channel, wherein the inlet checkball is normally biased by the inlet spring against an inlet seal. The inlet valve permits flow into the slave cylinder through the inlet duct, but prevents flow out of the inlet duct.

In an embodiment, a proportioning device is provided with an outlet valve. The outlet valve comprises an outlet checkball within an outlet duct having at least one elongated channel wherein the outlet checkball is normally biased by the outlet spring against an outlet seal. The outlet valve permits flow out of the slave cylinder through the outlet duct, but prevents flow into the slave cylinder through the outlet duct.

In an embodiment, a proportioning device is provided wherein the inlet valve and the outlet valve have an inlet orifice and an outlet orifice respectively. Further, in the embodiment, an inlet raised base is surroundably attached to the inlet orifice while an outlet raised base is surroundably attached to the outlet orifice.

It is, therefore, an advantage of the present invention to provide a proportioning device that is efficient.

An additional advantage of the present invention is to provide a fluid gate housing and bearing to seal the first fluid inside the body. Further, an advantage of the present invention is to provide protection of the body during installation of the fluid gate.

A further advantage of the present invention is to provide a motor piston which reduces friction between the motor cylinder.

A still further advantage of the present invention is to provide a more efficient slave pump by providing an inlet raised base and an outlet raised base within the inlet valve and the outlet valve.

Additional features and advantages of the present invention are described in, and will be apparent from, the detailed description of the presently preferred embodiments and from the drawings.

BRIEF DESCRIPTION OF THE DRAWINGS

FIG. 10 illustrates an exploded sectional side elevational view of the slave pump embodying principles of the present invention.

FIG. 11 illustrates in detail side view taken along line XI—XI of FIG. 10.

FIG. 12 illustrates in detail side view taken along line XII—XII of FIG. 10.

DETAILED DESCRIPTION OF THE PREFERRED EMBODIMENTS

Figure 1:
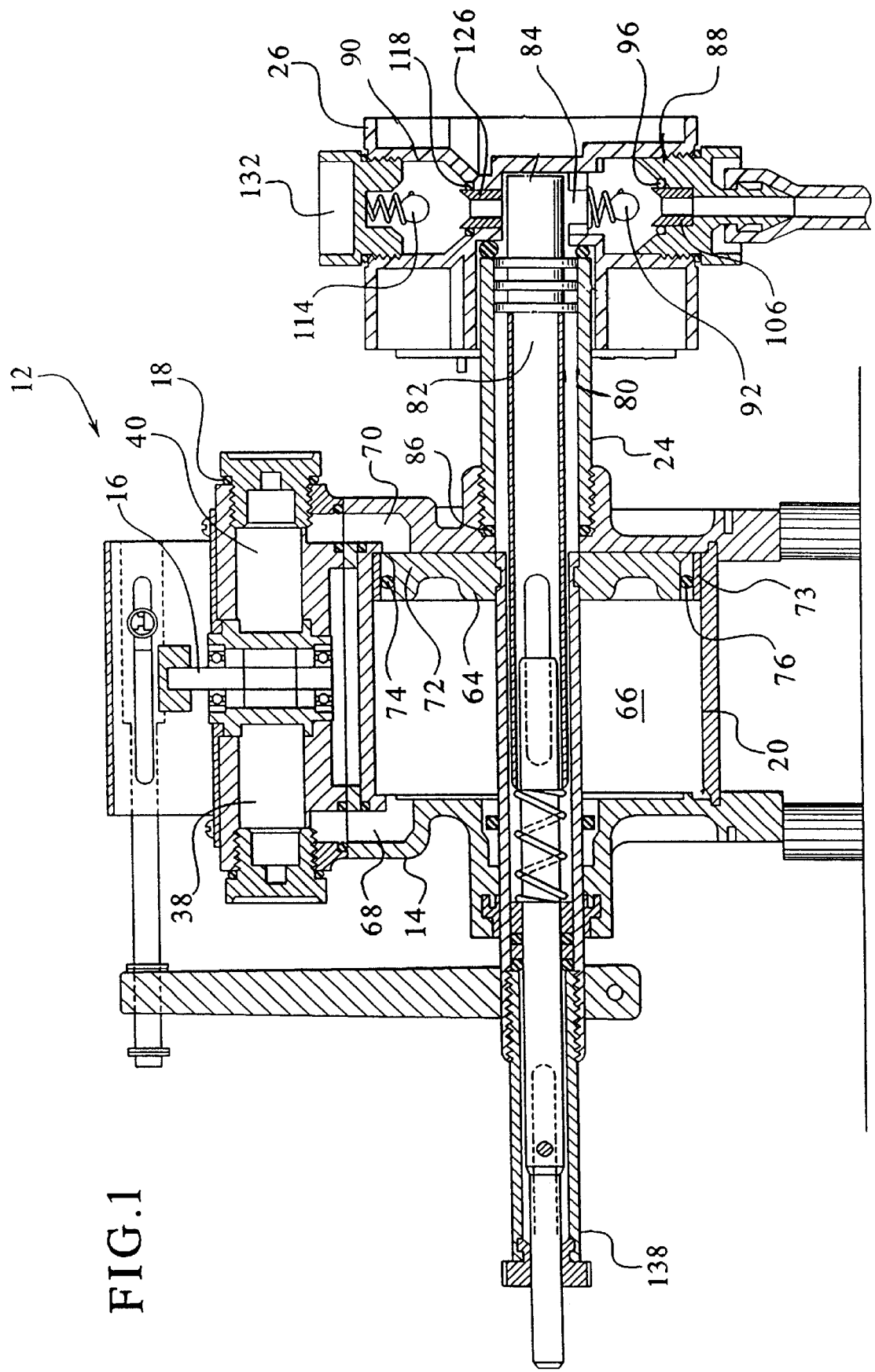
FIG. 1 illustrates a side sectional view of a proportioner embodying the principles of the present invention.

In accordance with the invention described, with reference to the accompanying figures, wherein like numerals designate like parts, a proportioner 12 is provided for proportionally mixing two fluids. FIG. 1 illustrates such proportioner 12. The proportioner 12 includes a housing 14, a fluid gate 16, a body 18, a fluid motor 20, a slave pump 24 and a slave pump head 26.

Figure 3:
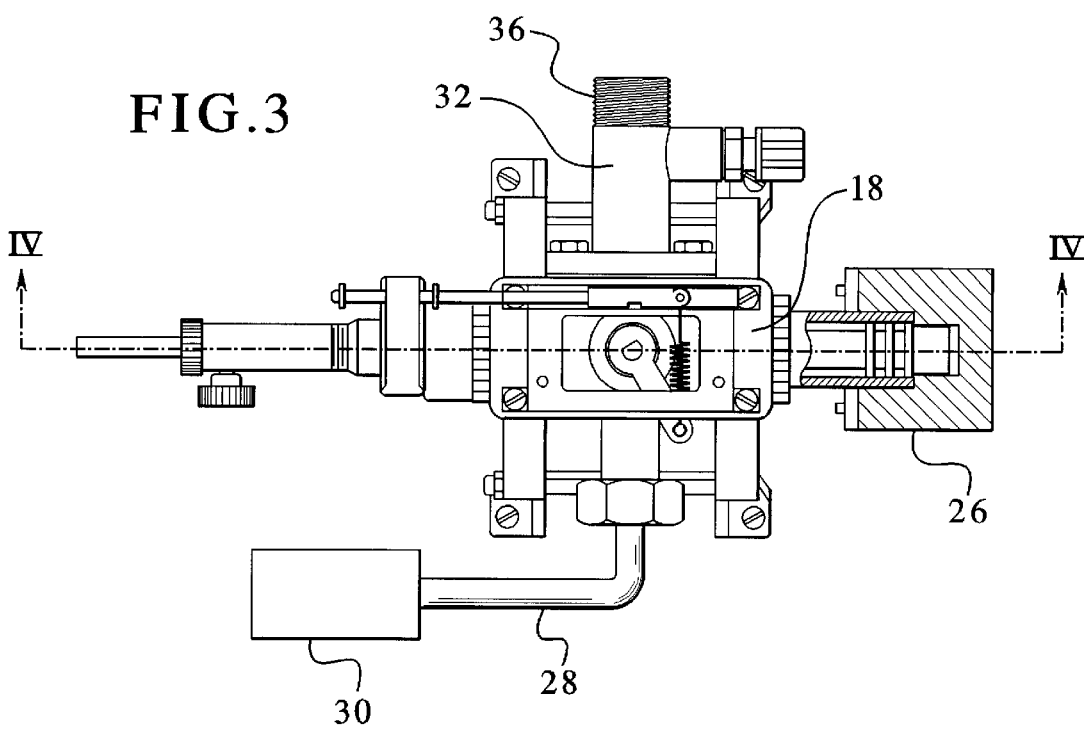
FIG. 3 illustrates a plan view of the proportioner.

A first fluid enters the fluid gate 16 through a first fluid supply tube 28 from a pressurized supply source 30 as shown in FIG. 3. The first fluid can be water or another liquid. The first fluid exits the body 18 into a manifold 32.

A second fluid is pumped by the slave pump 24. The second fluid can be any liquid, such as, but not limited to, a liquid containing a drug, vaccine, nutrient, treating agent or the like. The second fluid exits the slave pump 24 through a slave pump exit line (not shown). The slave pump exit line is connected to the manifold 32. Within the manifold 32, the first fluid mixes with the second fluid, and the resulting mixed fluid leaves the manifold 32 through a mixed stream exit line 36 as shown in FIG. 3.

Figure 2:
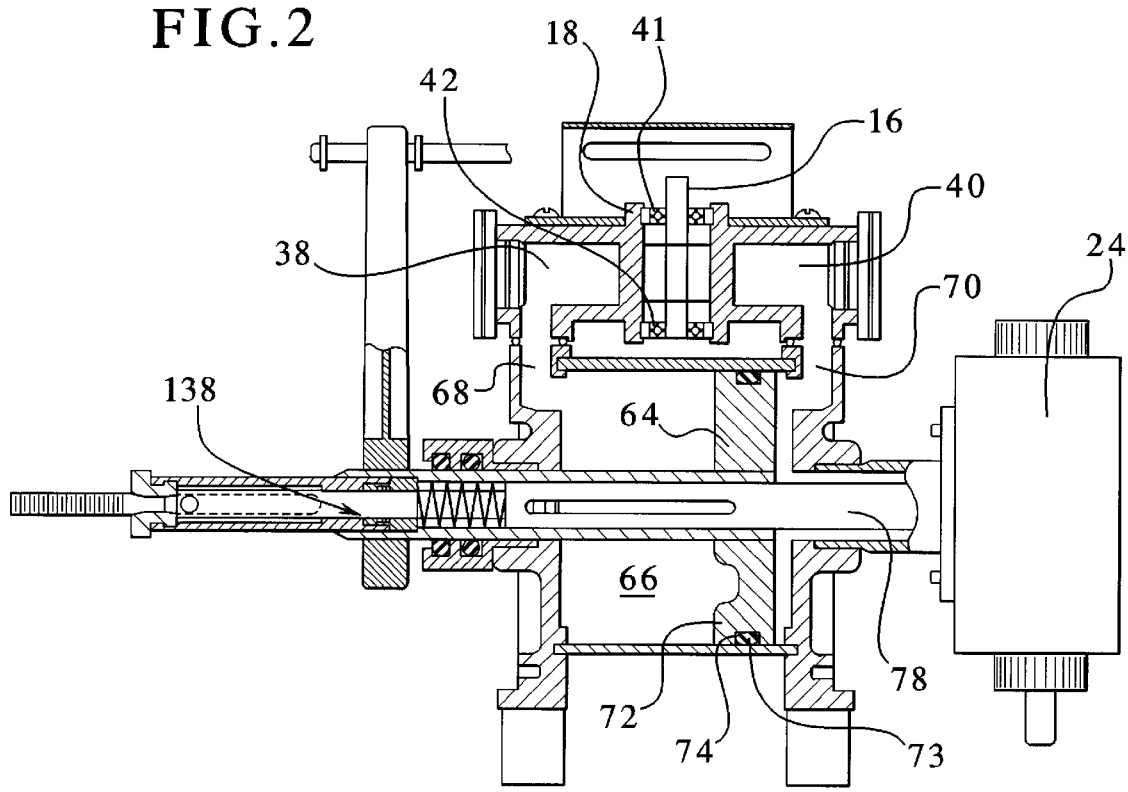
FIG. 2 illustrates a side sectional view of the proportioner embodying principles of the present invention.

As illustrated in FIG. 2, the first fluid is gated into the fluid motor 20 alternately via a first port 38 or second port 40 to apply fluid pressure to alternating sides of a motor piston 64 disposed within a motor cylinder 66. The first fluid is applied to the motor to piston 64 via a first channel 68 or second channel 70. Simultaneously, the first fluid is expelled from the opposite side of the motor piston 64 via port 38 or 40 causing cyclical motion of the motor piston 64.

Figure 4:
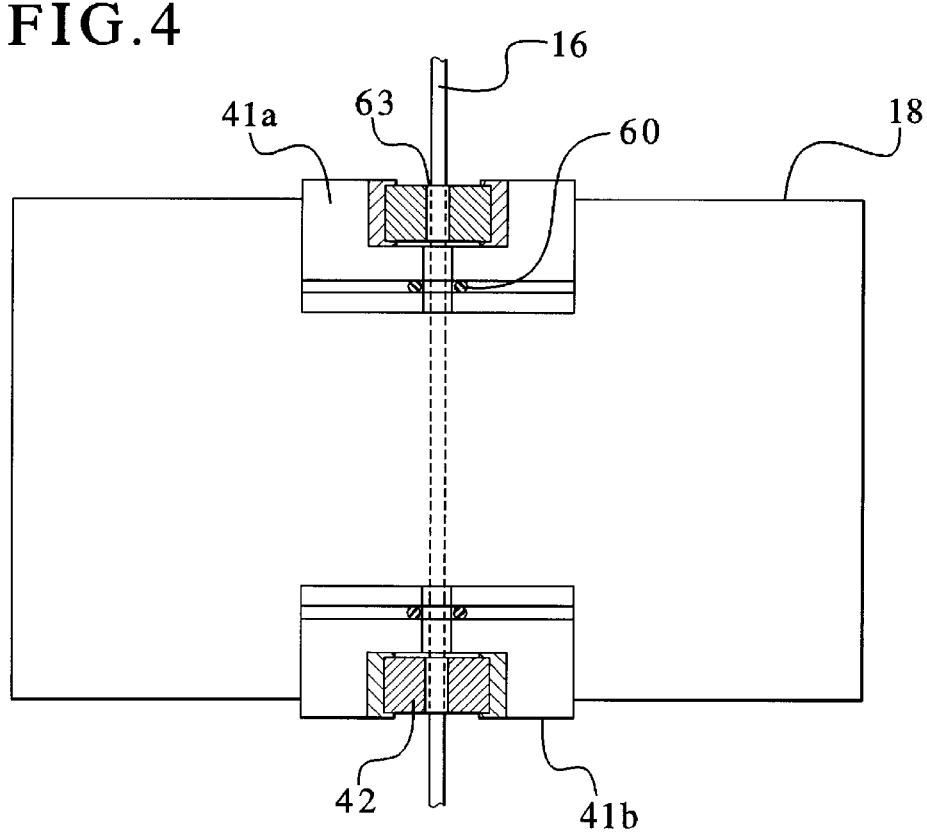
FIG. 4 illustrates an enlarged sectional view taken along line IV—IV of FIG. 3.

In the present invention, the fluid gate 16 is positioned through the body 18 as shown in FIGS. 2 and 4. In the preferred embodiment, the body 18 is made of metal. In other embodiments, however, the body 18 may be made of other materials, such as, but not limited to, plastic. As the first fluid is exposed to the fluid gate 16 within the body 18, excellent results are obtained when the body 18 is sealed around the fluid gate 16. In order to seal the fluid gate 16 to the body 18, at least one fluid gate housing 41 is pressurably fitted into an exterior side of the body 18 as shown in FIG. 4.

Preferably the fluid gate housing 41 is circularly shaped, although other shapes may be utilized. Additionally, in the preferred embodiment, the fluid gate housing 41 is positioned on the exterior side of the body 18 while another fluid gate housing 41 is positioned opposite on another exterior side of the body 18 as shown in FIGS. 2 and 4. Accordingly, the fluid gate 16 extends through the body 18 as shown in FIG. 4. In an alternative preferred embodiment, however, only one fluid gate housing 41 may be used on one exterior side of the body 18 when the fluid gate 16 does not extend all the way through the body 18.

Figure 5:
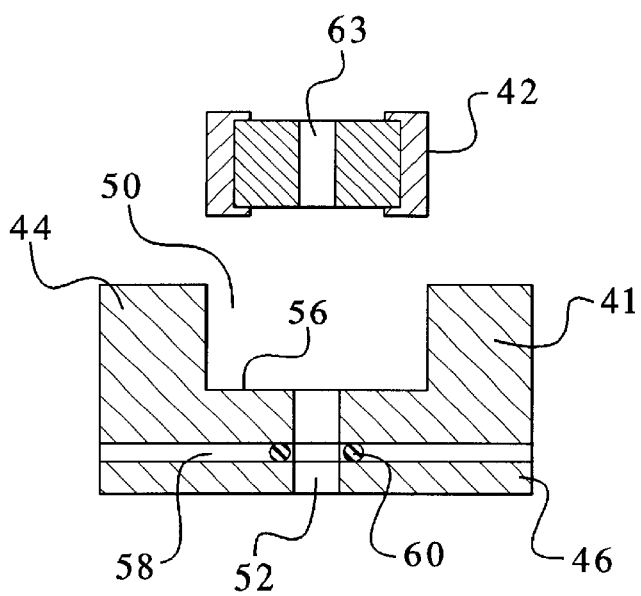
FIG. 5 illustrates an exploded sectional view of the housing and bearing.

As illustrated in FIGS. 4 and 5, the fluid gate housing 41 has a first end 44 and a second end 46 where the first end 44 is positioned outwardly from the exterior of the body 18 and the second end 46 is disposed within the body 18. The first end 44 is circularly shaped defining a first aperture 50 through the first end 44 while the second end 46 is also circularly shaped defining a second aperture 52 through the second end 46 as shown in FIG. 5.

As the second the aperture 52 is smaller than the first aperture 50, a seat 56 is configured above the second aperture 52. A groove 58 is located within the seat 56 in which a quad seal 60 is positioned inside the seat 56 to seal the first fluid from leaking from the interior of the body 18 out through the fluid gate housing 41 as shown in FIG. 5. Therefore, the first fluid is blocked by the fluid gate housing 41 from contacting sections of the fluid gate 16 which is not positioned within the body 18.

Figure 6:
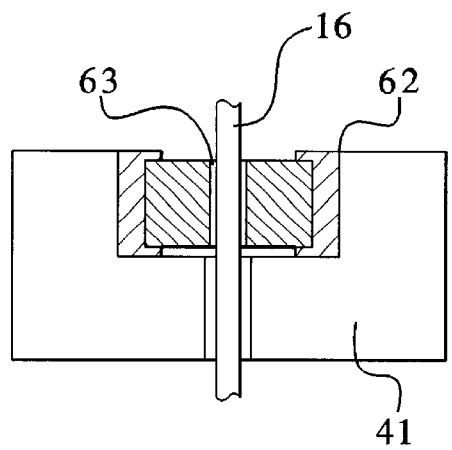
FIG. 6 illustrates a side sectional view of the fluid gate positioned within the housing and bearing.

As the fluid gate 16 extends into and rotates inside the interior of the body 18, a bearing 42 is pressurably fitted within the fluid gate housing 41 as shown in FIGS. 4–6. The bearing 42 is fitted on the seat 56 as shown in FIG. 5. The bearing 42 has an external race 62 and an internal race 63 in which the external race 62 contacts the fluid gate housing 41 within the first aperture 50. The internal race 63 is configured to guide the fluid gate 16 through the second aperture 54 and into the interior of the body 18 as shown in FIGS. 4 and 6. Thus, the internal race 63 and the second aperture 52 have the same size diameter. Accordingly, the fluid gate housing 41 is fixed within the body 18 while the internal race 63 of the bearing 42 rotates within the first end 44 of the fluid gate housing 41 along with the fluid gate 16.

During installation, the fluid gate 16 is positioned within the fluid gate housing 41 and bearing 42 is installed thereon. The installation and tolerances of the respective components are critical to the performance of the fluid gate 16. After installation of the fluid gate 16, the fluid gate housing 41 is turned upside down and the fluid gate 16 is secured to prevent movement along the vertical axis. The bearing 42 is pressed on the fluid gate 16 by exerting force on the internal race 63 only. As such, no force is applied to the external race 62. The tolerance between the internal race 63 and the fluid gate 16 is critical. In the preferred embodiment, a press of 0.0001 to 0.0002 inches must be maintained. Presses in excess of 0.0002 inches may distort the internal race 63.

During operation, the first fluid is dispersed into the body 18 by the first port 38 or the second port 40 while being directed alternatively by the fluid gate 16. The fluid gate housing 41 and the quad seal 60 situated within the seat 56 prevents the first fluid from leaking outside the body 18 by sealing the fluid gate 16. The bearing 42 further facilitates the operation by further sealing the first fluid by the external race 62 which contacts the fluid gate housing 41 while simultaneously rotating the internal race 63 with the fluid gate 16. Thus, during operation, the fluid gate 16 efficiently rotates within the internal race 63 while the first fluid is sealed within the body 18 by the fluid gate housing 41, eliminating the need for grease as a seal.

As the first fluid is directed to alternating sides of the motor piston 64, the motor cylinder 66 reciprocates within the motor cylinder 66. The motor cylinder 66 has a first displacement volume while the slave pump 24 has a second volume.

Figure 7:
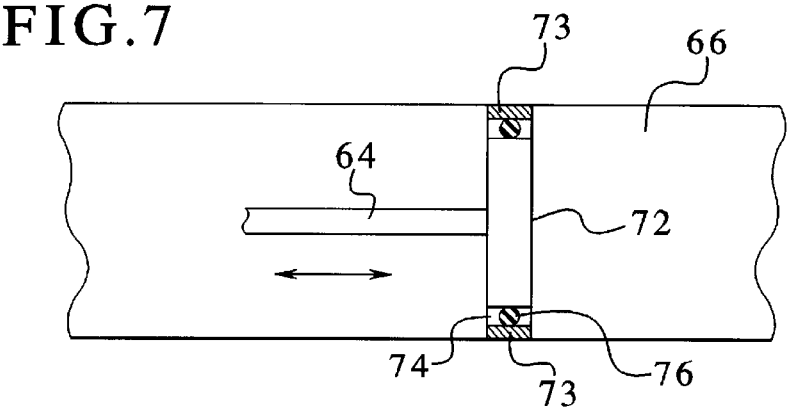
FIG. 7 illustrates a partial side sectional view of the cap of the motor piston.

Excellent performance ratios are obtained when the motor piston 64 has a cap 72 with a seal 73 attached as shown in FIGS. 1, 2 and 7. In the preferred embodiment, the cap 72 is made of a material such as, but not limited to, urethane. The seal 73 is also made of a friction reducing material such as, but not limited to, polyethylene. Other materials may be used for the cap 72 and the seal 73 which do not react with the first fluid.

Figure 9:
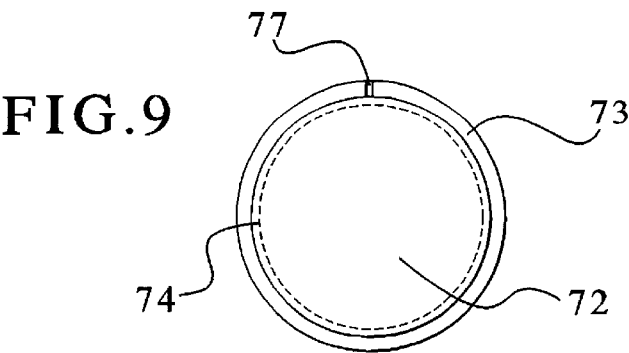
FIG. 9 illustrates an end view of the piston shown in FIG. 7.

As shown in FIG. 9, a concave annular groove 74 is machined into an outer circumference of the cap 72 around the periphery of the cap 72. The seal 73 is disposed around the concave annular groove 74 and extends beyond the cap 72 as shown in FIG. 7. By extending beyond the cap 72, the seal 73 reciprocally engages the motor cylinder 66. The material of the seal 73 reduces friction between the cap 72 and the motor cylinder 66 resulting in better performance of the motor piston 64. Additionally, the cap 72 and the seal 73 prevents any adhesion to the motor cylinder 66. Thus, at each stroke where the motor piston 64 changes direction, the motor piston 64 does not adhere to the motor cylinder 66 eliminating any rocking motion of the motor piston 66.

Figure 7A:
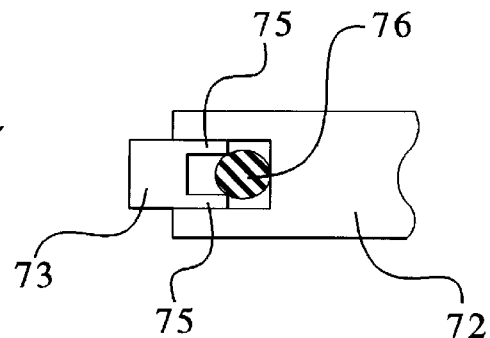
FIG. 7a illustrates in an enlarged fragmentary sectional view of FIG. 7.
Figure 8:
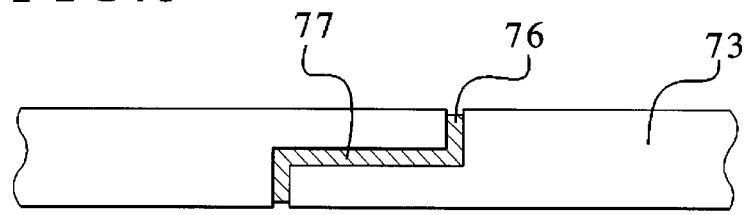
FIG. 8 illustrates in an enlarged fragmentary sectional view of the notch and seal.

As shown in FIG. 8, the seal 73 has a notch shaped split 77. The notch shaped split 77 allows the seal 73 to be opened up and easily positioned around the cap 72. As the seal 73 needs to be periodically replaced due to wear, the notch shaped split 77 allows the seal 73 to be efficiently and easily removed and replaced around the cap 72. In order to seal the area of the seal 73 around the notch shaped split 77, a piston O-ring 76 is positioned under the seal 73 against the concave annular groove 74 where the seal 73 has a plurality of tabs 75 to adhere the piston O-ring 76 as shown in FIGS. 7a and 8. As the seal 73 has. the same internal diameter as the external diameter of the piston O-ring 76, the piston O-ring 76 is configured to uniformly bias the seal 73 against the motor cylinder 66. Thus, uniform pressure is applied to the seal 73 by the piston O-ring 76 to evenly bias the seal 73 against the motor cylinder 66 for more efficient displacement of the motor piston 64. At low pressure of the first fluid, the seal 73 has improved efficiency by 30–40%. For example, tests indicate that at 20 pounds per square inch an increased mixed flow rate of four gallons per minute as opposed to three gallons per minute has been achieved. Tests further indicate that at 30 pounds per square inch, the mixed flow rate increased from four gallons per minute to six gallons per minute.

During operation, the first fluid is directed by the fluid gate 16 to alternating sides of the motor piston 64 within the motor cylinder 66. During movement of the motor piston 64, the piston O-ring 76 biases the seal 73 against the motor cylinder 66, causing the seal 73 to uniformly engage against the motor cylinder 66. This biased engagement reduces the friction between the motor piston 64 and cylinder wall 66, resulting in more efficient movement of the motor piston 64.

The present invention further provides a connecting rod 78 secured to the motor piston which moves with the motor piston 64. The connecting rod 78 extends toward the slave pump 24 through a cavity 80 in the housing 14. The connecting rod 78 is preferably cylindrical in shape, and the cavity 80 is shaped to complementarily enclose the connecting rod 78 as shown in FIG. 1.

The slave pump 24 comprises a slave piston 82 within a slave cylinder 84. The slave cylinder 84 has a second displacement volume. The slave piston 82 is secured to the connecting rod 78 and moves therewith. Additionally, in the present invention, a connecting rod seal is applied around the connecting rod 78 to prevent flow of the first fluid into the slave pump 24 and a vent is applied which are described in detail in U.S. Pat. No. 5,433,240. Disposed around the slave piston 82 are piston rings 86. The piston rings 86 are preferably made of a resilient material such as rubber or plastic, and have a U-shaped cross-section. A slave pump bead 26 is attached to the end of the slave cylinder 84. The slave pump head 26 includes a inlet valve 88 and a outlet valve 90.

The slave pump head 26 is shown in FIGS. 1 and 10, in which FIG. 10 is exploded to show the individual components of the inlet valve 88 and the outlet valve 90. The inlet valve 88 and outlet valve 90 are disposed in the slave pump head 26. The inlet valve 88 has an inlet checkball 92, an inlet spring 94, an inlet seal 96, and an inlet bridge 98 which are assembled in an inlet duct 100.

The inlet bridge 98 fits within the slave inlet duct 100 where the inlet spring 94 fits against the inlet bridge 98. The inlet bridge 98 provides support for the inlet spring 94 within the inlet duct 100, but is shaped to allow fluid flow through the inlet duct 100. The inlet bridge 98 is held in place by an inlet snap ring 102. The inlet spring 94 contacts the inlet checkball 92 and biases the inlet checkball 92 against the inlet seal 96 which fits in an inlet orifice 104. In the preferred embodiment, the inlet checkball 92 is made from a non-elostomer material. The inlet seal 96 is preferably an O-ring. The inlet orifice 104 is preferably formed in a threaded inlet cap 108 that is in communication with a source (not shown) for the second fluid. A threaded inlet cap 108 provides access to the components of the inlet valve 88. The threaded inlet cap has an inlet cap seal 110 to prevent leakage. The threaded inlet cap seal 110 is also preferably an O-ring. Additional fluid tubes may be connected to the inlet orifice 104 as described in detail in U.S. Pat. No. 5,433,240.

The inlet valve 88 is arranged so that the inlet spring 94 biases the inlet checkball 92 against the direction of flow into the slave cylinder 84. The inlet checkball 92 compresses the inlet spring 94 to open the inlet orifice 104 to allow flow into the slave cylinder 84. The inlet duct 100 is configured to have inlet elongated channels 112 which insure adequate flow around the inlet checkball 92. However, the inlet checkball 92 prevents flow out of the slave cylinder 84 by sealing against the inlet seal 96 when flow into the slave cylinder 84 ceases.

In the present invention, more efficient results are obtained when an inlet raised base 106 is applied at the inlet orifice 104 as shown in FIGS. 10 and 11. The inlet raised base 106 positions the inlet seal 96 to prevent the inlet seal 96 from being completely deformed by the inlet checkball 92. Thus, the inlet raised base 106 ensures optimum seating of the inlet seal 96 without excessive compression on the inlet seal 96 when acted upon by the inlet checkball 92. The inlet raised base 106 positions the inlet seal 96 so that not all of the surface area facing the inlet checkball 92 directly contacts the inlet checkball 92. Thus, the inlet raised base 106 is dimensioned so that the inlet checkball 92 will seat against and compress the inlet seal 96 a predetermined amount and will engage against the inlet raised base 106 preventing further compression of the inlet seal 96. Further, by angling the inlet seals 96 as shown in FIG. 11, any potential adhesion or sticking of the inlet checkball 92 in the inlet seal 96 is further reduced. Accordingly, the inlet seal 96 is positioned around the inlet orifice 104 to damper the inlet checkball 92 by concavably deforming when acted upon by the inlet checkball 92.

During operation, when the inlet spring 94 biases the inlet checkball 92 against the direction of flow of the second fluid, the inlet raised base 106 receives the inlet checkball 92 such that the inlet checkball 92 does not completely deform the inlet seal 96. The inlet raised base 106 is angled or chamfered which positions the inlet seal 96 to be crushed but not flattened by the inlet checkball 92.

The outlet valve 90 has an outlet checkball 114, an outlet spring 116, an outlet snap ring 128, and an outlet bridge 120 which are disposed in an outlet duct 122. Within the outlet duct 122 is an outlet orifice 124 against which the outlet seal 118 fits. The outlet seal 118 is preferably made of plastic or rubber. The outlet checkball 114 can rest against the outlet seal 118 to prevent flow into the slave cylinder 84. In the preferred embodiment, the outlet checkball 114 is made from a non-elastomer material. The outlet spring 116 contacts the outlet checkball 114 and normally biases the outlet checkball 114 against the outlet seal 118. The outlet spring 116 is retained by the outlet bridge 120 which is held in place by an outlet snap ring 128.

The outlet bridge 120 fits within the outlet duct 122 while the outlet spring 116 fits against the outlet bridge 120. The outlet bridge 120 provides support for the outlet spring 116 within the outlet duct 122, but is shaped to allow flow through the outlet duct 122. The outlet duct 122 is also configured to have outlet elongated channels 130 which insure adequate flow around the outlet checkball 114.

The outlet valve 90 is arranged so that the outlet spring 116 biases the outlet checkball 114 against the direction of flow leaving the slave cylinder 84. The outlet checkball 114 compresses the outlet spring 116, opening the outlet orifice 124 to allow flow out of the slave cylinder 84. However, the outlet checkball 114 prevents flow into the slave cylinder 84 by sealing against the outlet seal 118 when flow out of the slave cylinder 84 ceases.

In the present invention, more efficient results are obtained when an outlet raised base 126 is applied at the outlet orifice 124 as shown in FIGS. 10 and 12. The outlet raised base 126 positions the outlet seal 118 to prevent the outlet seal 118 from being completely deformed by the outlet checkball 114. Thus, the outlet raised base 126 ensures optimum seating of the outlet seal 118 without excessive compression on the outlet seal 118 when acted upon by the outlet checkball 114. The outlet raised base 126 positions the outlet seal 118 so that not all of the surface area facing the outlet checkball 114 directly contacts the outlet checkball 114. Thus, the outlet raised base 126 is dimensioned so that the outlet checkball 114. will seat against and compress the outlet seal 118 a predetermined amount and will then engage against the outlet raised base 126 preventing further compression of the outlet seal 118. Further, by angling the outlet seal 118 as shown in FIG. 11, any potential adhesion or sticking of the outlet checkball 114 in the outlet seal 118 is further reduced.

During operation, when the outlet spring 116 biases the outlet checkball 114 against the direction of flow, the outlet raised base 126 receives the outlet checkball 114 such that the outlet checkball 114 does not completely deform the outlet seal 118. The outlet raised base 126 is angled or chamfered which positions the outlet seal 118 to be crushed but not flattened by the outlet checkball 114.

A threaded outlet cap 132 provides access to the components of the outlet valve 90. The threaded outlet cap 132 has an outlet cap seal 134, which is preferably an O-ring. The threaded outlet cap 132 is in communication with a pump exit line.

Thus, during overall operation, the slave piston 82, which moves with the connecting rod 78, draws the second fluid through the inlet valve 88 into the slave cylinder 84 when the slave piston 82 moves away form the slave pump head 26. This movement fills a slave cylinder 84 with the second fluid. The second fluid is expelled from the slave cylinder 84 through the outlet valve 90 when the slave piston 82 moves toward the slave pump head 26. The expelled second fluid travels to the manifold 32, where it mixes with the first fluid expelled from the motor cylinder 66. During each cycle, the slave pump 24 expels the second fluid in an amount equaling one slave piston 82 displacement volume.

Additionally, in the present invention, there can be an adjustment mechanism 138 on the proportioner for proper adjusting the ratio of first and second fluids. FIG. 1 illustrates the adjustment mechanism 138, which is described in detail in U.S. Pat. No. 4,572,229.

Although the foregoing detailed description of the present invention has been described by reference to various embodiments, and the best mode contemplated for carrying out the prevention invention has been herein shown and described, it will be understood that modifications or variations in the structure and arrangement of these embodiments other than there specifically set forth herein may be achieved by those skilled in the art and that such modifications are to be considered as being within the overall scope of the present invention.

I claim:

1. A fluid proportioning device, comprising:
   a body configured to direct a first fluid within an interior of the body;
   a fluid gate disposed within the body configured to gate the first fluid to alternating sides of a motor piston to cause reciprocating movement of the motor piston within a motor cylinder;
   at least one fluid gate housing removably fixed to the body;
   a bearing pressurably fitted within the at least one fluid gate housing;
   a seal positioned between the interior and the bearing;
   a slave pump having a slave piston within a slave cylinder to pump a second fluid; and
   a connecting rod secured to the motor piston for movement therewith, the slave piston being secured to the connecting rod to reciprocally move the slave piston within the slave cylinder to pump the second fluid.

2. The fluid proportioning device of claim 1, wherein the at least one fluid gate housing has a first end and a second end, the first end configured in a first circular shape defining a first aperture therethrough, the second end configured in a second circular shape defining a second aperture therethrough, the second aperture dimensional smaller than the first aperture.

3. The fluid proportioning device of claim 2, wherein the at least one fluid gate housing has a seat configured within the second end.

4. The fluid proportioning device of claim 3 wherein the seal is removeably fixed inside the seat to prevent the first fluid from contacting the bearing.

5. The fluid proportioning device of claim 3, wherein the bearing is pressurably fitted within the at least one fluid gate housing to situate on the seat.

6. The fluid proportioning device of claim 1, wherein the bearing has an external race and an internal race positioned within the external race, the external race pressureably positioned within the first aperture, the internal race configured to rotate with the fluid gate to reduce friction of the fluid gate.

7. The fluid proportioning device of claim 6, wherein the internal race and the second aperture have equal diameters to align the fluid gate within the body.

8. The fluid proportioning device of claim 1, wherein the at least one fluid gate housing is configured to support the bearing during fluid gate installation.

9. The fluid proportioning device of claim 1, wherein the body is formed of plastic.

10. A fluid proportioning device, comprising:
    a body configured to direct a first fluid;
    a fluid gate disposed within the body configured to gate the first fluid to alternating sides of a motor cylinder;
    a motor piston sealably disposed within the motor cylinder, the motor piston having a cap attached at an end, the cap having a concave annular groove around its periphery;
    a seal surroundably disposed within the concave annular groove wherein a piston O-ring is disposed within the concave annular groove beneath the seal, the seal radially extending beyond the cap to pressurably engage against the motor cylinder to reduce friction between the cap and motor cylinder;
    a slave pump having a slave piston to pump a second fluid; and
    a connecting rod secured to the motor piston for movement therewith, the slave piston being secured to the connecting rod to reciprocally move the slave piston to pump the second fluid.

11. The fluid proportioning device of claim 10, wherein the piston O-ring is configured and sized to uniformly bias the seal out from the concave annular groove against the motor cylinder.

12. The fluid proportioning device of claim 10, wherein the seal consists of a split ring, the split ring having a notch shaped split therein.

13. The fluid proportioning device of claim 12, wherein the piston O-ring is positioned to seal the notch.

14. The fluid proportioning device of claim 10, wherein the cap is formed of polyethylene.

15. The fluid proportioning device of claim 10, wherein the seal is formed of urethane.

16. A fluid proportioning device, comprising:
    a body configured to direct a first fluid;
    a fluid gate disposed within the body configured to gate the first fluid to alternating sides of a motor piston to cause reciprocating movement of the motor piston within a motor cylinder;

a slave pump having a inlet valve and a outlet valve, the inlet valve including an inlet checkball and an inlet orifice therein, the outlet valve including an outlet checkball and an outlet orifice therein, an inlet raised base surrounding the inlet orifice wherein an inlet seal is positioned around the inlet raised base and the inlet raised base is dimensioned so that the inlet checkball will seat against and compress the inlet seal a predetermined amount and will then engage against the inlet raised base which will prevent further compression of the inlet seal;

an outlet raised base surrounding the outlet orifice; and a connecting rod secured to the motor piston for movement therewith to reciprocally pump a second fluid through the slave pump.

17. The fluid proportioning device of claim 16, further comprising an outlet seal positioned around the outlet raised base wherein the outlet raised base is dimensioned so that the outlet checkball will seat against and compress the outlet seal a predetermined amount and will then engage against the outlet raised base which will prevent further compression of the outlet seal.

18. A fluid proportioning device, comprising:

a body configured to direct a first fluid;

at least one fluid gate housing removably fixed to the body;

a bearing pressurably fitted within the at least one fluid gate housing;

a fluid gate disposed within the body configured to gate the first fluid to alternating sides of a motor cylinder;

a motor piston sealably disposed within the motor cylinder, the motor piston having a cap attached at an end, the cap having a concave annular groove around its periphery;

a seal surroundably disposed around the concave annular groove wherein a piston O-ring is disposed within the concave annular groove beneath the seal, the seal radially extending beyond the cap to pressurably engage against the motor cylinder to reduce friction between the cap and motor cylinder;

a slave pump driven by the motor piston having a inlet valve and an outlet valve, the inlet valve including an inlet checkball and an inlet orifice therein, the outlet valve including an outlet checkball and an outlet orifice therein, an inlet raised base surrounding the inlet orifice; and an outlet raised base surrounding the outlet orifice.

19. The fluid proportioning device of claim 18, wherein the at least one fluid gate housing has a first end and a second end, the first end configured in a first circular shape defining a first aperture therethrough, the second end configured in a second circular shape defining a second aperture therethrough, the second aperture dimensioned smaller than the first aperture.

20. The fluid proportioning device of claim 19, wherein the bearing has an external race and an internal race, the external race pressurably positioned within the first aperture, the internal race configured to rotate with the fluid gate to reduce friction of the fluid gate.

21. The fluid proportioning device of claim 18, wherein the seal consists of a split ring, the split ring having a notch shaped connection.

22. The fluid proportioning device of claim 18, further comprising an inlet seal positioned around the inlet raised base.

23. The fluid proportioning device of claim 18, further comprising an outlet seal positioned around the outlet raised base.

* * * * *